United States Patent [19]
Soderstrom

[11] 3,878,747
[45] Apr. 22, 1975

[54] CIRCULAR SAW BLADE

[75] Inventor: Lars Soderstrom, Hovas, Sweden

[73] Assignee: Centro-Metalcut AB, Gothenburg, Sweden

[22] Filed: May 21, 1974

[21] Appl. No.: 471,993

[30] Foreign Application Priority Data
  May 28, 1973 Sweden .............................. 7307499

[52] U.S. Cl. ...................... 83/835; 83/851; 83/854; 29/95.4; 29/103
[51] Int. Cl. ...................... B23d 45/00; B27b 33/08
[58] Field of Search ............ 83/835, 837, 848, 851, 83/854, 855; 29/95.4, 103

[56] References Cited
UNITED STATES PATENTS
3,576,200  4/1971  Elmes .................................. 83/848
3,792,524  2/1974  Pomernacki ..................... 83/854 X FOREIGN PATENTS OR APPLICATIONS
1,200,720  7/1970  United Kingdom .................. 83/835

*Primary Examiner*—Willie G. Abercrombie
*Attorney, Agent, or Firm*—Pierce, Scheffler & Parker

[57] ABSTRACT

A circular saw blade for use in cross-cutting metal wherein the teeth are so designed as to avoid vibrations and thereby stabilize the blade throughout the entire cut performed by the blade. The teeth include a top face with one or more top face chamfers, a primary clearance and therebeneath side clearances on both sides of the teeth wherein lines of the latter directed to the axis of rotation form with the central plane of the saw blade an acute angle directed to the center of rotation whereas other lines in the side clearances perpendicular to the first mentioned lines are parallel with the central plane.

2 Claims, 7 Drawing Figures

PATENTED APR 22 1975    3,878,747

A

B

CIRCULAR SAW BLADE

This invention relates to a circular saw blade for cross-cutting metal, which blade is provided with teeth comprising a top face with one or more top face chamfers, primary clearance and side clearances on both sides of the teeth.

The saw blade is intended for cutting in metal, particularly in steel of different grades, and is provided with brazed cemented carbide teeth.

The invention has the object of stabilizing the saw blade through the entire cut performed by the saw blade, so that vibrations in the saw blade are avoided and thereby a better tool economy is obtained.

For achieving said object, the invention has been given the characterizing features defined in the attached claims. The invention is described in the following, with reference to the accompanying drawings, in which FIG. 1 is a lateral view of a portion of a circular saw blade according to the invention.

Figure 1:
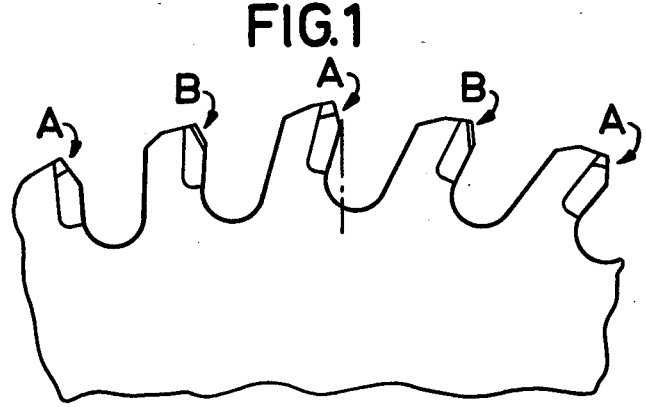

In the embodiment described, the circular saw blade comprises teeth, which are formed of cemented carbide and brazed onto the blade. The teeth on the blade shown are of two categories and designated by A and, respectively, B in FIG. 1. The teeth A are greater in height than the teeth B. The invention, however, is not restricted to an arrangement wherein each second tooth is higher and each second tooth is lower, but the relation between the tooth types A and B can be varied with respect to their number. Furthermore, the geometric shape for the details not comprised in the idea of the invention can be varied as explained below.

Figure 3:
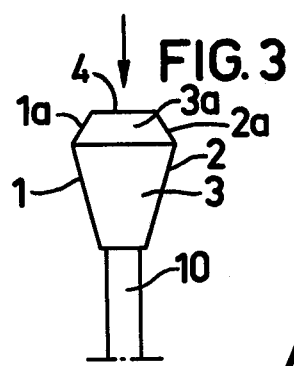
FIG. 3 shows a tooth according to FIG. 2 seen in the direction of the arrow in FIG. 2.
Figure 2:
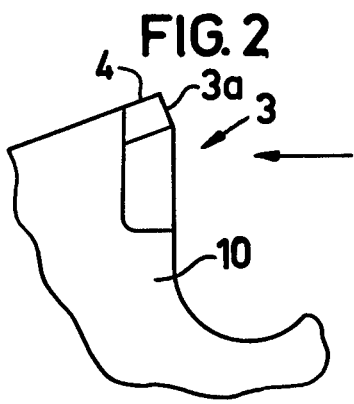
FIG. 2 is a lateral view of one of the teeth in the saw blade formed according to the invention.
Figure 4:
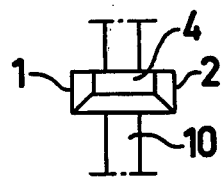
FIG. 4 shows the tooth seen from above and formed according to FIG. 2.

The tooth type A, thus, is shown in FIGS. 2–4 and comprises a tooth of cemented carbide, which is brazed onto the blade 10. The tooth includes a top face 3 with a top face chamfer 3a. A primary clearance 4 is formed, beneath of which extend the side clearances 1 and 2 on both sides of the tooth. In the embodiment of the tooth according to type A, two side clearance chamfers 1a and 2a are provided. According to the invention, the side clearances 1 and 2 are formed so as to form angles with the central plane of the blade 10 in the direction to the axis of rotation of the circular saw blade, but are in parallel with the central plane perpendicularly to said direction. This implies that the side clearances 1 and 2, seen in the direction of rotation of the circular saw blade, have no clearance angle.

Figure 6:
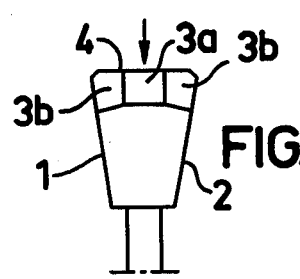
FIG. 6 shows the tooth seen in the direction of the arrow in FIG. 5.
Figure 5:
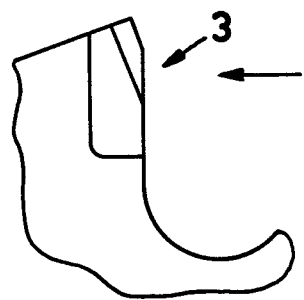
FIG. 5 shows a tooth having a geometric shape different of that of the tooth according to FIG. 2, but formed according to the idea of the invention.
Figure 7:
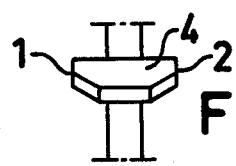
FIG. 7 shows the tooth according to FIG. 5 seen from above.

In the tooth shape according to FIGS. 5–7, type B, the tooth geometry is different from that shown for the type A in the aforementioned Figures, but the side clearances 1 and 2 are formed in the same manner. In this type B of the teeth, thus, the side clearances have no side clearance chamfers, but the side clearances extend upward to the primary clearance 4. The height of the tooth according to type B can advantageously be formed lower than the height for the tooth type A. The top face 3 comprises in this embodiment three top face chamfers 3a and, respectively, 3b.

What I claim is:

1. A circular saw blade for cross-cutting metal, comprising teeth including a top face with one or more top face chamfers, a primary clearance and side clearances on both sides of the teeth, in such a manner, that lines in the side clearances directed to the axis of rotation form with the central plane of the saw blade an acute angle directed to the centre of rotation, characterized in that lines in the side clearances perpendicular to the first mentioned lines are in parallel with the central plane.

2. A circular saw blade according to claim 1, characterized in that a number of the teeth have one top face chamfer and the remaining teeth have several top face chamfers.

* * * * *